US012010250B2

(12) United States Patent
Wang et al.

(10) Patent No.: US 12,010,250 B2
(45) Date of Patent: Jun. 11, 2024

(54) CAPABILITY ENABLING METHOD AND APPARATUS

(71) Applicant: Huawei Technologies Co., Ltd., Shenzhen (CN)

(72) Inventors: Sishan Wang, Beijing (CN); Xiaona Zhao, Shenzhen (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 467 days.

(21) Appl. No.: 17/290,497

(22) PCT Filed: Oct. 23, 2019

(86) PCT No.: PCT/CN2019/112731
§ 371 (c)(1),
(2) Date: Apr. 30, 2021

(87) PCT Pub. No.: WO2020/088323
PCT Pub. Date: May 7, 2020

(65) Prior Publication Data
US 2021/0359867 A1    Nov. 18, 2021

(30) Foreign Application Priority Data

Nov. 1, 2018    (CN) .......................... 201811297353.7
Dec. 5, 2018    (CN) .......................... 201811478516.1

(51) Int. Cl.
*H04L 9/32*    (2006.01)
(52) U.S. Cl.
CPC .......... *H04L 9/3268* (2013.01); *H04L 9/3242* (2013.01); *H04L 9/3247* (2013.01); *H04L 2209/80* (2013.01)

(58) Field of Classification Search
CPC .... H04L 9/3268; H04L 9/3242; H04L 9/3247
(Continued)

(56) References Cited

U.S. PATENT DOCUMENTS

2016/0234176 A1*  8/2016  Chu ........................ H04L 63/04
2017/0244565 A1*  8/2017  Bronk ................. H04W 12/106
(Continued)

FOREIGN PATENT DOCUMENTS

CN    105790938 A    7/2016
CN    106650461 A    5/2017
(Continued)

OTHER PUBLICATIONS

Chai, H., et al., "TEEI—A Mobile Security Infrastructure for TEE Integration," IEEE 13th International Conference on Trust, Security and Privacy in Computing and Communications, 2014, 7 pages.
(Continued)

*Primary Examiner* — Kambiz Zand
*Assistant Examiner* — Phuc Pham
(74) *Attorney, Agent, or Firm* — Conley Rose, P.C.

(57) ABSTRACT

A capability enabling method and apparatus. A secure element (SE) establishes, with a trusted execution environment (TEE), a session for communication. The SE sends, to the TEE, an obtaining instruction to obtain a security certificate of the TEE. After receiving the obtaining instruction, the TEE generates the security certificate based on attribute information of the TEE, and sends the generated security certificate to the SE. After the SE receives the security certificate, the SE determines, based on the security certificate and a preset security policy, that the TEE is in a secure state. After the SE determines that the TEE is in the secure state, the SE enables a first capability for a third-party service in the SE based on a second capability of the TEE.

20 Claims, 5 Drawing Sheets

(58) Field of Classification Search
USPC ........................................................ 713/175
See application file for complete search history.

(56) References Cited

U.S. PATENT DOCUMENTS

| | | | |
|---|---|---|---|
| 2018/0165472 A1* | 6/2018 | Adams | .................... G06F 21/83 |
| 2018/0176258 A1 | 6/2018 | Tea | |
| 2019/0138702 A1 | 5/2019 | Pan | |
| 2021/0065194 A1* | 3/2021 | Spichek | ................. G06N 20/00 |

FOREIGN PATENT DOCUMENTS

| | | | |
|---|---|---|---|
| CN | 107292177 A | 10/2017 |
| CN | 107562689 A | 1/2018 |
| CN | 107924449 A | 4/2018 |
| CN | 108229956 A | 6/2018 |
| CN | 108279914 A | 7/2018 |
| EP | 2037388 A1 | 3/2009 |
| EP | 3040924 A1 | 7/2016 |

OTHER PUBLICATIONS

Zhicong, L., et al., Analysis of Security Performance about the Implementations of NFC Mobile Payment, Microcomputer Applications, 2017, Issue 11, 5 pages.

* cited by examiner

CAPABILITY ENABLING METHOD AND APPARATUS

CROSS-REFERENCE TO RELATED APPLICATIONS

This application is a National Stage of International Application No. PCT/CN2019/112731, filed on Oct. 23, 2019, which claims priority to Chinese Patent Application No. 201811478516.1, filed on Dec. 5, 2018, which claims priority to Chinese Patent Application No. 201811297353.7, filed on Nov. 1, 2018. All of the aforementioned applications are hereby incorporated by reference in their entireties.

TECHNICAL FIELD

This application relates to the field of terminal security verification technologies, and in particular, to a capability enabling method and apparatus.

BACKGROUND

To ensure security of executing a service by a terminal, a trusted execution environment (trusted execution environment, TEE)+secure element (secure element, SE) security architecture is introduced in the terminal. In the TEE+SE security architecture, an SE with a relatively high security level cooperates with a TEE with a lower security level than the SE, to execute a service with a relatively high security requirement in the terminal.

In the prior art, when a service is executed by using the TEE+SE security architecture, an SE cooperates with a TEE to execute the service. Because the TEE has a lower security level than the SE, when the TEE has a security vulnerability, security of executing the service by using the TEE+SE security architecture may not be ensured.

SUMMARY

Embodiments of this application provide a capability enabling method and apparatus, to resolve a prior-art problem that security of executing a service by using a TEE+SE security architecture cannot be ensured.

According to a first aspect, an embodiment of this application provides a capability enabling method. The method may be performed by an SE or an apparatus (for example, a chip system) that can support the SE in implementing the method. This application provides description by using an example in which the SE performs the method. The method includes: The SE establishes, with a TEE, a session used for communication. The SE sends, to the TEE by using the session, an obtaining instruction used to obtain a security certificate of the TEE. The TEE receives the obtaining instruction from the SE by using the session. After receiving the obtaining instruction, the TEE generates the security certificate based on attribute information of the TEE, and sends the generated security certificate to the SE by using the session. After the SE receives, by using the session, the security certificate sent by the TEE, the SE determines, based on the security certificate and a preset security policy, that the TEE is in a secure state. After the SE determines that the TEE is in the secure state, the SE enables a first capability for a third-party service in the SE. The first capability is implemented based on a second capability of the TEE.

In the method, when a service is executed by using a TEE+SE security architecture, before the service is executed, the SE may establish, with the TEE, the session used for communication. The SE may request, by using the session, to obtain the security certificate of the TEE, and then may determine, based on the security certificate of the TEE and the preset security policy, that the TEE is in the secure state. After determining that the TEE is in the secure state, the SE enables the first capability for the third-party service in the SE. In this way, the SE enables the capability for the third-party service in the SE only when ensuring that the TEE is in the secure state, thereby ensuring security of executing the service in the TEE+SE security architecture.

In a possible design, the TEE may perform a digital signature or message authentication code (message authentication code, MAC) operation on the attribute information of the TEE by using a key, to generate the security certificate. The generated security certificate may include the attribute information of the TEE. The key may include a private key of the TEE, a preconfigured key, or a key negotiated by the TEE with the SE.

In a possible design, the security certificate of the TEE may include the attribute information of the TEE. In this design, the SE may determine, by determining that the attribute information of the TEE meets the preset security policy, that the TEE is in the secure state. In this way, the SE may self-set a condition in which the TEE is in the secure state, so that only when the TEE meets a secure state approved by the SE, the SE can enable, for the third-party service in the SE, the first capability implemented based on the second capability of the TEE, thereby improving security of service execution.

In this embodiment of this application, the second capability of the TEE is not limited. In a possible design, the second capability of the TEE may include a trusted user interface (trusted user interface, TUI) capability. In this design, the attribute information of the TEE may include platform attribute information of the TEE and/or attribute information of the TUI capability. The platform attribute information of the TEE may include but is not limited to at least one of the following: an identifier of the TEE, a supplier or developer identifier of the TEE, an operating system version of the TEE, a boot status of the TEE, a lifecycle status of the TEE, application programming interface API version information of the TEE, an anti-rollback level of the TEE, or version information of an interactive application in the TEE. The interactive application is a trusted application used to communicate with the SE in the TEE. The attribute information of the TUI capability includes a peripheral type of a TUI and/or a peripheral attribute of the TUI.

In this embodiment of this application, establishment of the session used for communication that is established by the SE with the TEE may be actively initiated by the SE, or may be actively initiated by the TEE. This application focuses on describing a method in which the SE actively initiates establishment of the session.

In a possible design, the SE actively initiates establishment of the session used to communicate with the TEE. The SE sends a session establishment request message to the TEE. The session establishment request message is used to request to establish the session with the TEE. The SE receives a session establishment response message sent by the TEE. The session establishment response message is used to indicate that the TEE acknowledges to establish the session. In this method, the SE actively initiates a session establishment process, so that the SE can establish the session with the TEE when having a communication requirement, thereby avoiding an unnecessary waste of communication resources.

In a possible design, if the SE actively initiates establishment of the session, before the SE sends the session establishment request message to the TEE, the SE may further trigger an interrupt signal by using a communications module. The interrupt signal is used to indicate the TEE to receive the session establishment request message. In this method, before initiating establishment of the session, the SE may trigger the interrupt signal, to indicate, by using the interrupt signal, the TEE to receive the session establishment request message to be sent by the SE, so that the TEE can receive the session establishment request message more accurately.

In a possible design, before determining, based on the security certificate and the preset security policy, that the TEE is in the secure state, the SE may further perform authentication on the security certificate to determine that the security certificate is generated by the TEE and is not tampered with. In this way, the SE needs to perform security verification on the security certificate sent by the TEE, to ensure that the security certificate is generated by the TEE and is not tampered with, in other words, to ensure integrity and security of the security certificate, and further needs to determine that the TEE is in the secure state. In this method, dual security verification on the TEE is implemented, so that a verification result for the TEE is more accurate.

In a possible design, the obtaining instruction sent by the SE to the TEE may include attribute identifiers of the TEE. The obtaining instruction is used to indicate the TEE to generate the security certificate by using TEE attributes corresponding to the attribute identifiers of the TEE. In this design, the TEE may perform, by using a key, a digital signature or MAC operation on the TEE attributes corresponding to the attribute identifiers of the TEE, to generate the security certificate. In this method, the SE adds the attribute identifiers of the TEE to the obtaining instruction sent to the TEE, so that the attributes of the TEE that the SE needs to verify can be indicated without requiring the TEE to send all attribute information, thereby reducing signaling overheads.

In a possible design, after determining that the TEE is in the secure state, the SE may further negotiate a communication key with the TEE, where the negotiated communication key is bound to a status of the TEE, and the communication key is used by the SE to communicate with the TEE; and the SE may delete the communication key when determining that the TEE is rebooted or the TEE attributes change. In this method, after verifying that the TEE is in the secure state, the SE negotiates, with the TEE, the communication key used for communication. The communication key is bound to the status of the TEE, in other words, the communication key is always used for communication between the TEE and the SE provided that the status of the TEE does not change, so that the SE does not need to verify a security status of the TEE during each time of communication, thereby improving communication efficiency. In addition, when determining that the status of the TEE changes, the SE may delete the communication key, perform security verification on the TEE again by using the method provided in this application, and negotiate a new communication key.

According to a second aspect, an embodiment of this application provides a capability enabling apparatus. The apparatus has a function of implementing behavior of the SE in the method examples in the first aspect. The function may be implemented by using hardware, or may be implemented by using hardware to execute corresponding software. The hardware or software includes one or more modules corresponding to the function.

In a possible design, the apparatus includes a communications module and a processing module. In some possible implementations, the apparatus may further include a storage module. These modules may perform corresponding functions in the method examples in the first aspect. For details, refer to the detailed descriptions in the method examples. The details are not described herein.

In another possible design, a structure of the apparatus includes a processor, a memory, and a transceiver. The processor, the memory, and the transceiver may be connected by using a bus. The processor invokes an instruction stored in the memory, to perform the foregoing method.

According to a third aspect, an embodiment of this application provides a capability enabling apparatus. The apparatus has a function of implementing behavior of the TEE in the method examples in the first aspect. The function may be implemented by using hardware, or may be implemented by using hardware to execute corresponding software. The hardware or software includes one or more modules corresponding to the function.

In a possible design, the apparatus includes a communications module and a processing module. In some possible implementations, the apparatus may further include a storage module. These modules may perform corresponding functions in the method examples in the first aspect. For details, refer to the detailed descriptions in the method examples. The details are not described herein.

In another possible design, a structure of the apparatus includes a processor, a memory, and a transceiver. The processor, the memory, and the transceiver may be connected by using a bus. The processor invokes an instruction stored in the memory, to perform the foregoing method.

According to a fourth aspect, an embodiment of this application further provides a computer readable storage medium. A computer program is stored in the computer readable storage medium. When the program is executed by a processor, the computer is enabled to perform the method according to any one of the first aspect or the designs of the first aspect.

According to a fifth aspect, an embodiment of this application further provides a computer program product. An instruction is stored in the computer program product. When the instruction runs on a computer, the computer is enabled to perform the method according to any one of the first aspect or the designs of the first aspect.

DESCRIPTION OF EMBODIMENTS

The following describes this application in detail with reference to accompanying drawings of this specification.

Some terms in this application are first described, to help persons skilled in the art have a better understanding.

(1) A terminal may be a device that provides voice and/or data connectivity for a user, and is also referred to as user equipment (user equipment, UE), a mobile station (mobile station, MS), a mobile terminal (mobile terminal, MT), or the like. For example, the terminal may be a handheld device or a vehicle-mounted device having a wireless connection function. Currently, some examples of the terminal are a mobile phone (mobile phone), a tablet computer, a notebook computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

(2) A rich execution environment (rich execution environment, REE) is a running environment having no specific security function in a terminal. For example, an Android operating system is a rich execution environment.

(3) A trusted execution environment (trusted execution environment) TEE is a running environment that coexists with a common execution environment (alternatively referred to as a rich execution environment (rich execution environment, REE)) in a terminal.

The TEE is supported by hardware, and therefore has a security capability, can meet a specific security requirement, and can implement a running mechanism isolated from the REE. The TEE has own running space for which a strict protection measure is defined. Therefore, the TEE has a higher security level than the REE, can protect an asset (such as data or software) in the TEE from a software attack and resist a specific type of security threat. Only authorized security software can be executed in the TEE, and the TEE also protects confidentiality of a resource and data of the security software. Due to a protection mechanism of the TEE, such as isolation and authority control, the TEE can better ensure security of data and a resource than the REE.

(4) A trusted application (trusted application, TA) is an application running in a TEE, and can provide a security-related service for a client application (client application, CA) running outside the TEE.

(5) A client application (client application, CA) is usually an application running in a REE. However, in some cases in which a TA invokes a TA, the TA actively initiating the invocation may also serve as a CA. The CA may invoke a TA by using a client application programming interface (application programming interface, API) and enable the TA to perform a corresponding security operation.

(6) A secure element (secure element, SE) is a hardware unit having tamper-resistance and anti-hardware attack capabilities, has an independent processor, can provide a secure running environment for an applet (applet) or a third-party service running in the SE, and can ensure security and confidentiality of an asset stored in the SE. Common secure elements include an embedded secure element (embedded secure element, eSE), an inSE integrated into a system on chip (system on chip, SoC) of a mobile phone, a universal integrated circuit card (universal integrated circuit card, UICC), and the like.

(7) A trusted user interface (trusted user interface, TUI) is a security function provided by a TEE operating system, may be understood as a secure display interface controlled by a TEE, can provide a trusted user interaction interface for each TA running in the TEE, and can ensure that content cannot be obtained by a REE or even another TA when the TA is used, thereby improving service security. A global platform (global platform) standardizes common APIs of the TUI, to help a TA developer to develop the TUI by using these APIs. The following three most basic secure user interaction functions can be implemented by using the TUI: secure display, secure input, and secure indication marking. For a service conducted based on a TEE+SE security architecture, a TEE usually provides a TUI capability. For example, in the financial field, the central bank's mobile phone shield specification specifically requires that security of password input and a signature content display interface should be ensured by using a TUI.

(8) A root of trust (root of trust) is a computing engine, code, and some data (if any) that coexist on a same platform, and can provide a security service. No other entity can provide credible certificates (in a digest form or another form) for initial statuses of the code and the data in the root of trust. It is more common to understand that some code or hardware has been protected so well that the code or hardware is not likely to be damaged, or cannot be modified at all, or cannot be modified without a password credential. Therefore, the code or hardware can serve as a basis of trust, which is referred to as the root of trust in the related field. The root of trust is usually the first piece of code that is loaded into a random access memory (random access memory, RAM) after a device is booted or that directly runs in a chip. A secure boot process is used as an example. A chain of trust may be extended based on a root of trust, that is, the root of trust stores a signature of a next module/bootloader (bootloader), before the next module is run in the boot process, code in the root of trust first verifies the signature of the next module (to ensure that only code that is authorized and not tampered with can be executed), and after the verification succeeds, the next module is allowed to be executed. Likewise, the verified module continues to verify a signature of a next-level module of the module. In this way, verification is performed level by level until the system is fully booted. In this scenario, starting from the root of trust, the boot process extends a chain of trust for secure boot.

A security service that can be provided based on the root of trust includes authentication (authentication), authorization (authorization), encryption (confidentiality), identification (identification), integrity (integrity) verification, measurement (measurement), reporting (reporting), update (update), verification (verification), or the like.

The measurement may provide a capability of reliably generating platform characteristics (platform characteristics). The reporting may report platform characteristics in an undeniable manner. A combination of the measurement and the reporting enables the device to generate a security certificate. A remote server can determine a status and credibility of software, hardware, or firmware of the device by verifying the security certificate reported by the device.

(9). A trusted execution environment (trusted execution environment, TEE)+secure element (secure element, SE) security architecture is an architecture in which a TEE and an SE are combined to jointly provide a security service for an application.

(10) A mobile phone shield is a product or an application program that implements a bank USB key (usbkey) function by using a mobile phone. The mobile phone shield uses a TEE+SE security architecture. An SE of the mobile phone may provide the mobile phone shield with a high security environment required for all functions such as a cryptographic operation and a CA digital certificate. The mobile phone shield provides a mobile Internet application with a cryptographic operation support capability for identity authentication, electronic signature, data protection, and the like.

The following uses a mobile phone shield service as an example to describe a service execution procedure in an existing TEE+SE security architecture. In the TEE+SE security architecture, a signature key of a mobile phone shield is stored in an SE, and all signature operations are performed in the SE, thereby ensuring that a signature process is financially secure. A user may perform some large transactions or other high-sensitivity operations on a mobile phone. When a service can be performed only after being signed by using the mobile phone shield, to-be-signed information is sent to a TEE, is displayed by using a TUI, and is acknowledged by the user. After acknowledging that the to-be-signed information is correct, the user enters a personal identification number (personal identification number, PIN) of the mobile phone shield. The PIN is sent to a signature applet in the SE for verification. After the verification succeeds, the transaction information acknowledged by the user is sent to the applet for signature. Therefore, non-repudiation of a transaction is ensured by using a digital signature technology.

In the mobile phone shield service execution procedure, the TUI plays two important roles: 1. The TUI ensures security of entering the PIN by the user. The TUI can be accessed only by using the mobile phone shield, and neither an application on a REE side nor another application in the TEE can obtain user input in a manner such as screen reading or keyboard reading, to ensure that the PIN does not leak, and also ensure that the PIN is entered in real time. 2. The TUI ensures "what is presented is what is signed" (or "what is signed is what is presented"), that is, the TUI is used to ensure that the transaction information sent to the mobile phone shield for signature is not tampered with or replaced. In this way, information sent to the SE for signature after the user acknowledges that the transaction information is correct is information acknowledged by the user. Currently, it is generally considered in the industry that the REE side is insecure and can be attacked in various manners. Without introduction of the TEE, transaction information, a user PIN, and the like all may be obtained or tampered with by a malicious program, and then the malicious program/a hacker can skip a user for transaction or modify transaction content for fraud. Clearly, introduction of the TUI plays a significant defense role against a conventional malicious attack means on the REE side.

(11) In the description of this application, unless otherwise stated, "a plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 1:
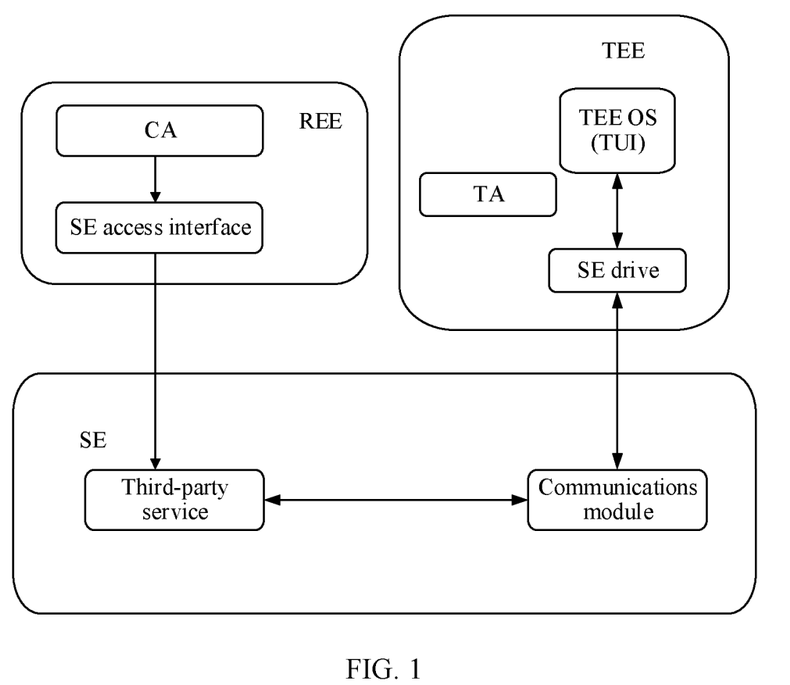
FIG. 1 is a schematic diagram of an existing capability enabling architecture.

FIG. 1 is a schematic diagram of an existing capability enabling architecture. As shown in FIG. 1, the architecture includes three parts: an SE, a TEE, and a REE. A CA can be run in the REE, a TA can be run in the TEE, and a third-party service (which may also be referred to as a third-party applet (applet)) can be run in the SE. In addition, the REE may further include an SE access interface. The SE access interface may be configured to access the third-party service in the SE. The TEE may further include an SE drive. The SE drive implements a capability of communicating with the SE. The TEE may further include a TEE operating system (TEE OS). The TEE OS is configured to manage and maintain running of the TEE. The TEE OS may provide the SE with some TEE functions, for example, a TUI capability. The SE may further include a communications module. The SE may use the communications module to send a message to the TEE or receive a message sent by the TEE. It should be understood that only some modules are shown in the architecture shown in FIG. 1. In actual application, the architecture may further include more or fewer modules. This application is only illustrated by using the architecture in FIG. 1, and is not limited thereto.

When a service is executed based on the architecture shown in FIG. 1, the SE may cooperate with the TEE to execute the service. The TEE mainly provides the TUI capability, and the SE mainly performs an operation related to security or cryptography. When the SE uses the TUI capability of the TEE, after completing interaction with a user by using a TUI, the TA in the TEE returns an interaction result to the communications module in the SE by using the SE drive. After receiving the interaction result by using the communications module, the SE directly executes the service. Because the TEE has a lower security level than the SE, when the TEE has a security vulnerability, security of executing the service by using the TEE+SE security architecture may not be ensured.

Based on the foregoing problem, the embodiments of this application provide a capability enabling method, to resolve a prior-art problem that security of executing a service by using a TEE+SE security architecture cannot be ensured.

Figure 2:
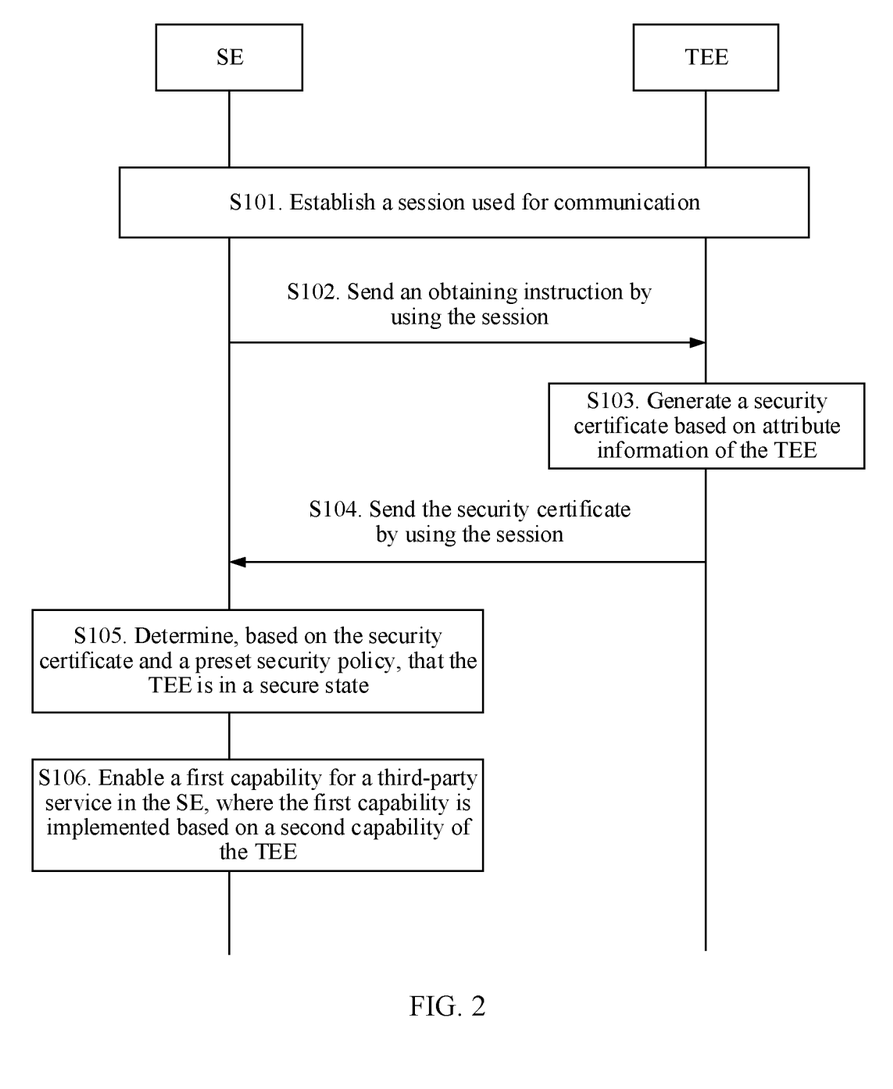
FIG. 2 is an implementation flowchart of a capability enabling method according to an embodiment of this application.

FIG. 2 is an implementation flowchart of a capability enabling method according to an embodiment of this application. Referring to FIG. 2, the method includes the following steps.

S101. An SE establishes, with a TEE, a session used for communication.

In this embodiment of this application, establishment of the session used for communication that is established by the SE with the TEE may be actively initiated by the SE, or may be actively initiated by the TEE. In a method in which the TEE actively initiates establishment of the session, after detecting/scanning an SE to which the TEE can establish a connection, the TEE may actively establish a session with the SE by using an SE drive, that is, send a session establishment request to the SE, and the SE passively responds to the session establishment request. In this application, the method in which the TEE actively initiates establishment of the session is not described in detail. This application focuses on describing a method in which the SE actively initiates establishment of the session.

When the SE actively initiates establishment of the session used to communicate with the TEE, the SE sends a session establishment request message to the TEE. The session establishment request message is used to request to establish the session with the TEE. After receiving the session establishment request message, the TEE sends a session establishment response message to the SE. The session establishment response message is used to indicate that the TEE acknowledges to establish the session. The SE receives the session establishment response message sent by the TEE, to complete session establishment with the TEE. In this method, the SE actively initiates a session establishment process, so that the SE can establish the session with the TEE when having a communication requirement, thereby avoiding an unnecessary waste of communication resources. In this application, an occasion in which the SE actively initiates establishment of the session is not limited. In a possible implementation, the procedure in which the SE actively initiates establishment of the session may be performed in a running environment initialization process of the SE (which may be understood as a power-on boot process of the SE) or after a period of time after running environment initialization of the SE.

In a possible instance, if the SE actively initiates establishment of the session, before the SE sends the session establishment request message to the TEE, the SE may further trigger an interrupt signal by using a communications module. The interrupt signal is used to indicate the TEE to receive the session establishment request message. It may be understood that the interrupt signal may serve as a signal for actively initiating establishment of the session by the SE. In this way, once the SE triggers the interrupt signal by using the underlying communications module, both the SE and the TEE may learn that the SE is to actively initiate establishment of the session, and then may prepare for establishment of the session, to implement instruction interaction on upper layers of the SE and the TEE by using a standard API interface for interaction between the TEE and the SE, so that the TEE can receive the session establishment request message more accurately.

Optionally, the communications module configured to trigger the interrupt signal may be an interprocess communication (interprocess communication, IPC) module or another underlying hardware module.

In this application, the session establishment request message sent by the SE to the TEE may be an IPC instruction specially set for initiating establishment of the session by the SE, and a flag bit of the IPC instruction may be used to indicate that the SE requests to establish the session with the TEE. When receiving the IPC instruction by using a mailbox, the TEE receives the session establishment request message sent by the SE.

Figure 3:
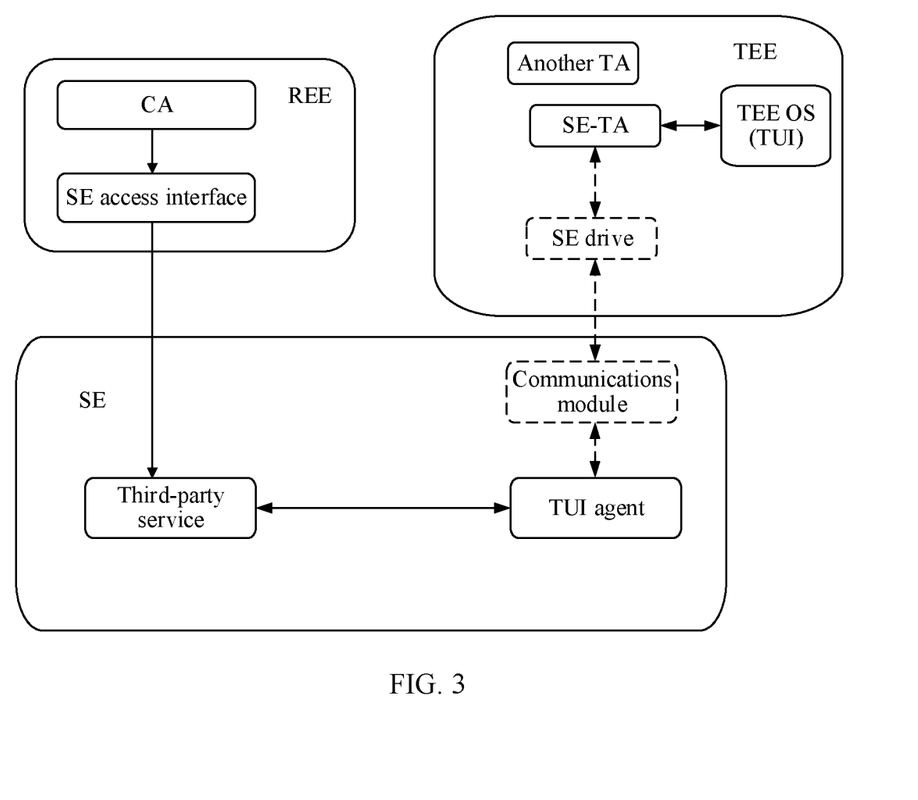
FIG. 3 is a schematic diagram of an architecture according to an embodiment of this application.

In this embodiment of this application, in order that the SE actively initiates establishment of the session and uses a TUI, a TUI agent (TUI agent) may be specially disposed in the SE. In addition, to cooperate with the SE in using the TUI, an application module (SE-TA) may be specially disposed in the TEE, as shown in FIG. 3. For a specific function, refer to the following description.

Optionally, the session used for communication that is established by the SE with the TEE may be established by the TUI agent (TUI agent) in the SE with the SE-TA in the TEE by using the standard API for interaction between the TEE and the SE.

In an implementation, in a process in which the TUI agent in the SE establishes the session with the SE-TA in the TEE, after obtaining the interrupt signal, the SE drive (which may serve as a communications agent of the SE) in the TEE parses the interrupt signal, and triggers the SE-TA in the TEE to establish the session with the TUI agent in the SE by using the API between the TEE and the SE.

In another implementation, in a process in which the TUI agent in the SE establishes the session with the SE-TA in the TEE, a client API (client API) communications module is disposed/implemented in the SE, and the TUI agent in the SE serves as a client (client) to actively send a session establishment instruction to the SE-TA in the TEE by using a standard TA access interface.

In still another implementation, in a process in which the TUI agent in the SE establishes the session with the SE-TA in the TEE, after the SE drive in the TEE obtains the interrupt signal, as a communications agent of the SE, the SE drive serves as a client to establish the session with the SE-TA in the TEE by using a client API.

S102. The SE sends, to the TEE by using the session, an obtaining instruction used to obtain a security certificate of the TEE, and the TEE receives the obtaining instruction from the SE by using the session.

In a possible instance, the SE may send the obtaining instruction to the SE-TA in the TEE by using the TUI agent in the SE, and the TEE receives the obtaining instruction by using the SE-TA in the TEE. In this instance, after receiving the obtaining instruction, the SE-TA in the TEE may verify identification information of the TUI agent, and after the verification succeeds, obtain attribute information of the TEE to generate the security certificate.

In this embodiment of this application, the attribute information of the TEE may include platform attribute information of the TEE and/or attribute information of a TUI capability. The platform attribute information of the TEE may include but is not limited to at least one of the following: an identifier of the TEE, a supplier or developer identifier of the TEE, an operating system version of the TEE, a boot status of the TEE, a lifecycle status of the TEE, application programming interface API version information of the TEE, an anti-rollback level of the TEE, or version information of an interactive application in the TEE. The interactive application is a trusted application used to communicate with the SE in the TEE. The attribute information of the TUI capability may include a peripheral type of the TUI and/or a peripheral attribute of the TUI. The identifier of the TEE is used to uniquely identify the TEE. The supplier or developer identifier of the TEE is used to uniquely identify a supplier or developer of the TEE.

In some possible instances, the platform attribute information of the TEE may further include version information of the SE-TA, a device certificate, an application certificate of the SE-TA, and the like.

The boot status of the TEE may include secure TEE boot or insecure TEE boot.

The peripheral attribute of the TUI may include TEE controllable (TEE controllable) or TEE ownable (TEE ownable). When the peripheral attribute of the TUI is TEE controllable, a peripheral of the TUI may be used by both the TEE and a REE, but is controlled by the TEE. When the peripheral attribute of the TUI is TEE ownable, a peripheral of the TUI is completely exclusively owned by the TEE.

Optionally, the obtaining instruction may include attribute identifiers of the TEE. In this case, the obtaining instruction is used to indicate the TEE to generate the security certificate by using TEE attributes corresponding to the attribute identifiers of the TEE.

It should be noted that when the obtaining instruction includes the attribute identifiers of the TEE. The attribute identifiers of the TEE may be determined by the SE based on a preset security policy. For example, if the preset security policy includes that the operating system version of the TEE needs to be a version later than a specific version, the attribute identifiers of the TEE may include an identifier of the operating system version of the TEE.

S103. After receiving the obtaining instruction, the TEE generates the security certificate based on the attribute information of the TEE.

In a possible implementation, the obtaining instruction does not include the attribute identifiers of the TEE. In this case, the TEE generates the security certificate based on all attribute information that can be obtained by the TEE or preset attribute information. Specifically, the TEE performs a digital signature or message authentication code (message authentication code, MAC) operation on the attribute information of the TEE by using a key, to generate the security certificate. That the TEE performs a MAC operation on the attribute information of the TEE by using a key may be understood as follows: The TEE generates MAC by using the key, to ensure integrity of the attribute information of the TEE by using the MAC.

The security certificate includes the attribute information of the TEE. The key includes a private key of the TEE, a preconfigured key, or a key negotiated by the TEE with the SE. The key may be a symmetric key or an asymmetric key.

In another possible implementation, the obtaining instruction includes the attribute identifiers of the TEE. In this case, the TEE generates the security certificate based on the TEE attributes corresponding to the attribute identifiers of the TEE that are included in the obtaining instruction. Specifically, the TEE queries/obtains the TEE attributes corresponding to the attribute identifiers, arranges the TEE attributes according to a preset format, and performs, by using a key, a digital signature or MAC operation on the TEE attributes corresponding to the attribute identifiers of the TEE, to generate the security certificate. The security certificate includes TEE attribute information corresponding to the attribute identifiers of the TEE.

Optionally, the TEE may generate the security certificate of the TEE by using a root of trust (root of trust, RoT) service (such as measurement or reporting) interface provided by the TEE.

It may be understood that the TEE may generate the security certificate by using the SE-TA in the TEE.

S104. The TEE sends the generated security certificate to the SE by using the session, and the SE receives, by using the session, the security certificate sent by the TEE.

It may be understood that the TEE may send the generated security certificate to the TUI agent in the SE by using the SE-TA in the TEE.

S105. After the SE receives, by using the session, the security certificate sent by the TEE, the SE determines, based on the security certificate and the preset security policy, that the TEE is in a secure state.

In an implementation, the security certificate includes the attribute information of the TEE. When determining that the attribute information of the TEE meets the preset security policy, the SE determines that the TEE is in the secure state. In this application, there may be one or more security policies. When there are a plurality of security policies, when determining that the attribute information of the TEE meets all the security policies, the SE determines that the TEE is in the secure state.

It may be understood that the SE may determine, by using the TUI agent in the SE, that the TEE is in the secure state.

The following use several instances to describe how the SE determines, based on the attribute information of the TEE and the preset security policy by using the TUI agent in the SE, that the TEE is in the secure state.

For example, a preset security policy of the TUI agent in the SE is determining, only when the peripheral attribute of the TUI is TEE ownable, that the TEE is secure. In this way, when determining that the peripheral attribute of the TUI is TEE ownable, the SE may determine that the TEE is in the secure state.

For another example, a preset security policy of the TUI agent in the SE is determining, when the operating system version of the TEE is later than 20180101xxx, that the TEE is secure. In this way, when determining that the operating system version of the TEE is later than 20180101xxx, the SE may determine that the TEE is in the secure state.

S106. After the SE determines that the TEE is in the secure state, the SE enables a first capability for a third-party service in the SE. The first capability is implemented based on a second capability of the TEE, which may be understood that the first capability is obtained through encapsulation based on the second capability. In this embodiment of this application, the second capability of the TEE is not limited, and the second capability of the TEE may include the TUI capability.

In this embodiment of this application, after determining that the TEE is in the secure state, the SE may further notify the TEE to complete an authentication process.

For example, the second capability of the TEE is the TUI capability. After determining that the TEE is in the secure state, the SE may register, as a global service (global service) of the SE, the first capability (which may be referred to as a TUI service of the SE in the SE) implemented based on the TUI capability of the TEE, to enable the first capability for the third-party service in the SE.

After the first capability is registered as the global service of the SE, the first capability can be invoked for all third-party services in the SE.

In a possible instance, the SE may send a broadcast to the third-party service that needs to be registered by using the global service.

In this embodiment of this application, after receiving the security certificate of the TEE, the SE may further store the security certificate. When the third-party service is registered by using the global service, the security certificate may be sent to the third-party service in response to a request of the third-party service. In this case, some security policies may also be set for the third-party service to determine whether the global service is to be used for the third-party service.

In the method, when a service is executed by using a TEE+SE security architecture, before the service is executed, the SE may establish, with the TEE, the session used for communication. The SE may request, by using the session, to obtain the security certificate of the TEE, and then may determine, based on the security certificate of the TEE and the preset security policy, that the TEE is in the secure state. After determining that the TEE is in the secure state, the SE enables the first capability for the third-party service in the SE. In this way, the SE enables the capability for the third-party service in the SE only when ensuring that the TEE is in the secure state, thereby ensuring security of executing the service in the TEE+SE security architecture.

In a possible instance, before determining, based on the security certificate and the preset security policy, that the TEE is in the secure state, the SE may further perform authentication on the security certificate to determine that the security certificate is generated by the TEE and is not tampered with. It may be understood that the SE performs authentication on the security certificate to ensure that the security certificate comes from a valid TEE.

For example, authentication on the security certificate is performed by using the TUI agent in the SE. In a possible implementation, the TUI agent may invoke a preset verification key to verify the security certificate, to ensure that the security certificate comes from a valid TEE or a TEE trusted by the TUI agent.

In the method provided in this embodiment of this application, the SE needs to perform security verification on the security certificate sent by the TEE, to ensure that the security certificate is generated by the TEE and is not tampered with, in other words, to ensure integrity and security of the security certificate, and further needs to determine, based on the security policy, that the TEE is in a secure state approved by the SE. In this method, dual security verification on the TEE is implemented, so that higher security is ensured when the SE uses and enables a TEE capability.

In a possible instance, after determining that the TEE is in the secure state, the SE may further negotiate a communication key with the TEE, where the negotiated communication key is bound to a status of the TEE, and the communication key is used by the SE for encryption in a subsequent process of using the second capability; and the SE may delete the communication key when determining that the TEE is rebooted or the TEE attributes change.

In this method, after verifying that the TEE is in the secure state, the SE negotiates, with the TEE, the communication key used for communication. The communication key is bound to the status of the TEE, in other words, the communication key is always used for communication between the TEE and the SE provided that the status of the TEE does not change, so that the SE does not need to verify a security status of the TEE during each time of communication, thereby improving communication efficiency. In addition, when determining that the status of the TEE changes, the SE may delete the communication key, perform security verification on the TEE again by using the method provided in this application, and negotiate a new communication key.

Optionally, the communication key may include a session key derived based on the communication key.

It should be noted that when there are a plurality of TEEs in a device in which the SE is located, the SE may obtain security certificates of the plurality of TEEs, and separately verify the security certificates of the plurality of TEEs to determine a plurality of TEEs that meet the security policy. After determining the plurality of TEEs that meet the security policy, the SE may separately implement corresponding first capabilities based on TUI capabilities of these TEEs that meet the security policy. When enabling the first capability for the third-party service in the SE, the SE may display a plurality of available first capabilities implemented based on the TUI capabilities of the TEEs, so that a specific first capability is selected for the third-party service.

This embodiment of this application provides a method for performing security verification on a TEE in an SE above. However, this application is not limited to performing security verification on the TEE only in the SE. In a possible implementation, the SE may send the preset security policy to the TEE, authentication of the TEE on the SE is completed in the TEE, and an authentication result is sent to the SE. If the verification result is that the verification succeeds, that is, the TEE attributes meet the preset security policy of the SE, the SE may enable the first capability for the third-party service in the SE after receiving the authentication result.

Figure 4:
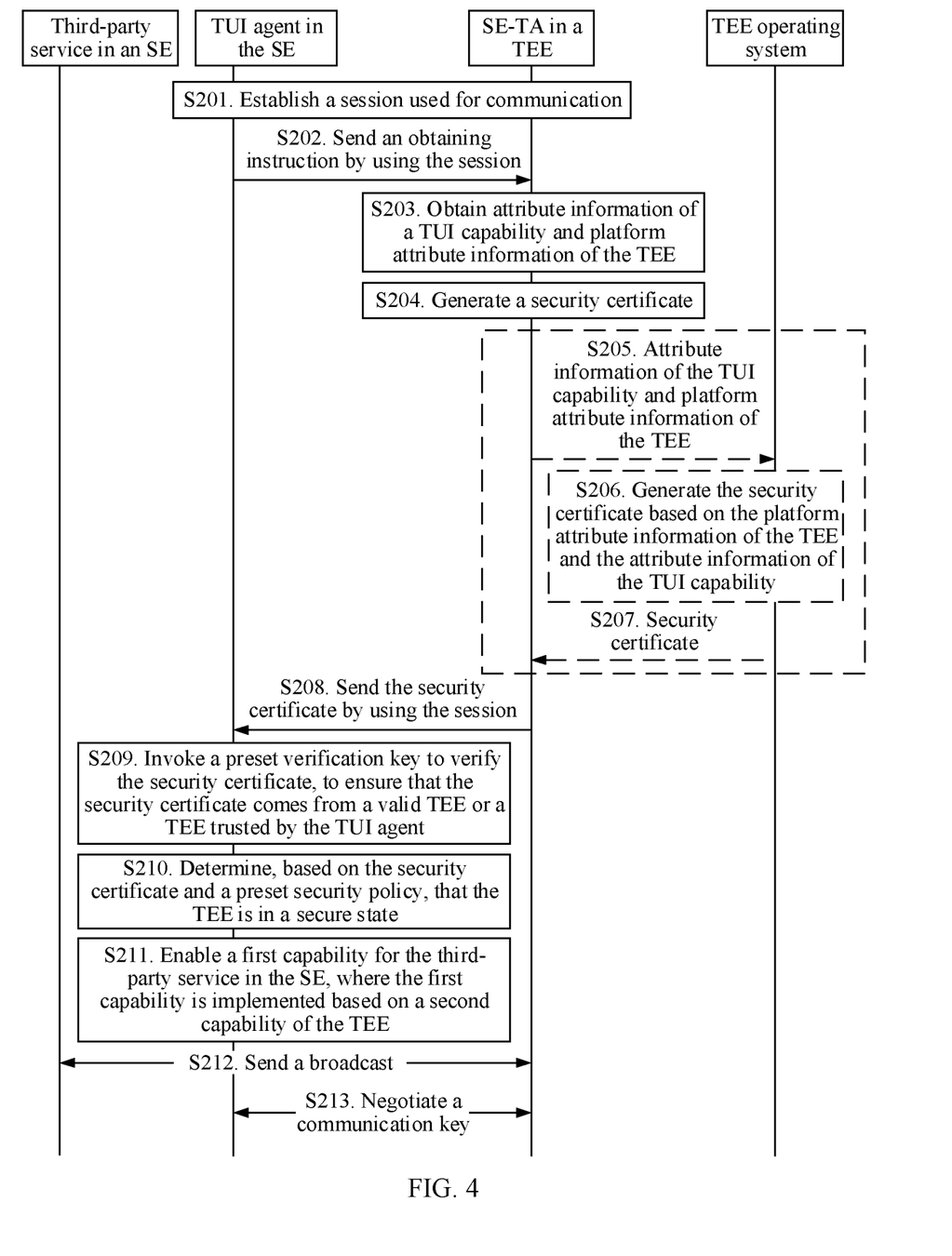
FIG. 4 is an implementation flowchart of another capability enabling method according to an embodiment of this application.

With reference to FIG. 3 and FIG. 4, the following uses an example to describe the capability enabling method provided in the embodiments of this application.

FIG. 3 is a schematic diagram of an architecture according to an embodiment of this application. In addition to all the modules in the architecture shown in FIG. 1, the architecture in FIG. 3 further includes a TUI agent (TUI agent) specially disposed in the SE in order that the SE actively initiates establishment of a session and uses a TUI, and an application module (SE-TA) that is specially disposed in the TEE to cooperate with the SE in using the TUI. Modules in the architecture that are the same as the modules in FIG. 1 have same functions as the modules in FIG. 1. Details are not described again. It should be understood that only some modules are shown in the architecture shown in FIG. 3. In actual application, the architecture may further include more or fewer modules. FIG. 3 is used only for illustration but not for limitation.

The embodiments of this application provide a method for implementing the embodiments of this application based on the architecture shown in FIG. 3 below. FIG. 4 is a flowchart of another capability enabling method according to an embodiment of this application. FIG. 4 provides description by using an example in which an SE and a TEE implement, by respectively using a TUI agent in the SE and an SE-TA in the TEE, the capability enabling method provided in this application.

The method shown in FIG. 4 includes the following steps.

S201. The TUI agent establishes, with the SE-TA, a session used for communication.

It should be noted that in this application, all TUI agents are TUI agents in SEs, and all SE-TAs are SE-TAs in TEEs.

The following provides description by using an example in which the TUI agent actively initiates establishment of the session.

Before the TUI agent actively initiates establishment of the session, the SE may further trigger an interrupt signal by using a communications module. The interrupt signal is used to indicate that the TUI agent actively initiates establishment of the session. For a specific trigger manner, refer to the related descriptions in FIG. 2. Details are not described herein again.

S202. The TUI agent sends, to the SE-TA by using the established session, an obtaining instruction used to obtain a security certificate of the TEE, and the SE-TA receives the obtaining instruction by using the established session.

Optionally, the obtaining instruction may include attribute identifiers of the TEE. In this case, the obtaining instruction is used to indicate the TEE to generate the security certificate by using TEE attributes corresponding to the attribute identifiers of the TEE.

S203. After receiving the obtaining instruction, the SE-TA may verify identification information of the TUI agent, and after the verification succeeds, may obtain attribute information of a TUI capability and platform attribute information of the TEE.

In a possible implementation, the SE-TA may obtain the attribute information of the TUI capability by using a TUI query interface provided by a TEE operating system, and obtain the platform attribute information of the TEE by using a platform attribute query interface provided by the TEE operating system.

S204. After obtaining the attribute information of the TUI capability and the platform attribute information of the TEE, the SE-TA generates the security certificate.

In a possible instance, after obtaining the attribute information of the TUI capability and the platform attribute information of the TEE, the SE-TA may further send the obtained attribute information of the TUI capability and the obtained platform attribute information of the TEE to the TEE operating system. The TEE operating system generates the security certificate based on the platform attribute information of the TEE and the attribute information of the TUI capability. After generating the security certificate, the TEE operating system sends the security certificate to the SE-TA. Refer to S205 to S207.

S205. The SE-TA sends the attribute information of the TUI capability and the platform attribute information of the TEE to the TEE operating system.

S206. The TEE operating system generates the security certificate based on the platform attribute information of the TEE and the attribute information of the TUI capability.

S207. The TEE operating system sends the security certificate to the SE-TA.

For a specific security certificate generation manner and content included in the platform attribute information of the TEE and the attribute information of the TUI capability, refer to the descriptions in the method shown in FIG. 2.

S208. The SE-TA sends the security certificate to the TUI agent by using the session, and the TUI agent receives the security certificate by using the session.

S209. After the TUI agent receives the security certificate by using the session, the TUI agent may invoke a preset verification key to verify the security certificate, to ensure that the security certificate comes from a valid TEE or a TEE trusted by the TUI agent.

S210. The TUI agent determines, based on the security certificate and a preset security policy, that the TEE is in a secure state. For a specific determining manner, refer to the descriptions in the method shown in FIG. 2.

S211. After determining that the TEE is in the secure state, the TUI agent enables a first capability for a third-party service in the SE.

Optionally, the TUI agent may send a broadcast to the third-party service that needs to be registered by using the global service. Certainly, the broadcast may also be sent to the SE-TA. Refer to S212 in FIG. 4.

Optionally, after determining that the TEE is in the secure state, the TUI agent may further negotiate a communication key with the TEE, where the negotiated communication key is bound to a status of the TEE, and the communication key is used by the SE for encryption in a subsequent process of using a second capability; and the SE may delete the communication key when determining that the TEE is rebooted or the TEE attributes change. For the process, refer to S213 in FIG. 4.

In the method provided in this application, when a service is executed by using a TEE+SE security architecture, before the service is executed, the SE may establish, with the TEE, the session used for communication. The SE may request, by using the session, to obtain the security certificate of the TEE, and then may determine, based on the security certificate of the TEE and the preset security policy, that the TEE is in the secure state. After determining that the TEE is in the secure state, the SE enables the first capability for the third-party service in the SE. In this way, the SE enables the capability for the third-party service in the SE only when ensuring that the TEE is in the secure state, thereby ensuring security of executing the service in the TEE+SE security architecture.

Based on the same invention concept as the method embodiments, an embodiment of this application further provides a capability enabling apparatus. It may be understood that, for implementing the foregoing functions, the capability enabling apparatus includes corresponding hardware structures and/or software modules for executing the functions. Persons of ordinary skill in the art should be easily aware that algorithm steps in the examples described with reference to the embodiments disclosed in this specification may be implemented by using hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 5:
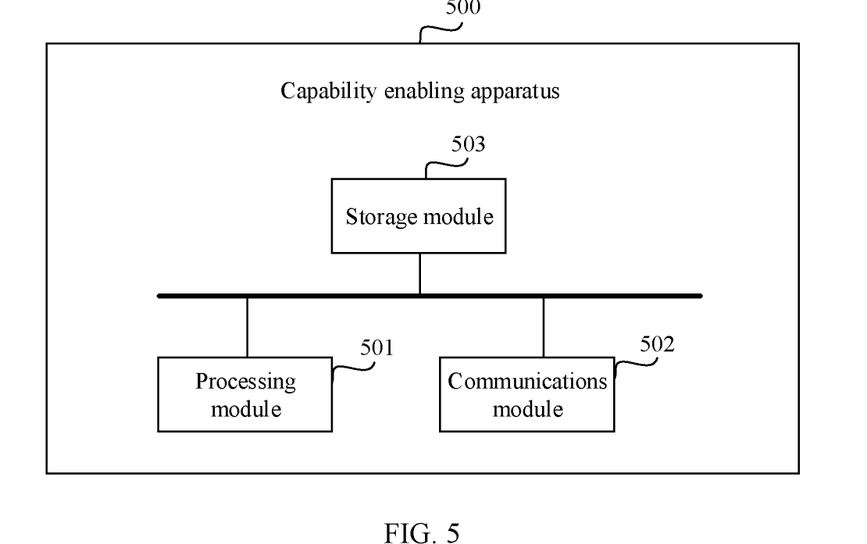
FIG. 5 is a schematic structural diagram of a capability enabling apparatus according to an embodiment of this application.

When an integrated unit is used, FIG. 5 is a possible schematic structural diagram of a capability enabling apparatus according to an embodiment of this application. The capability enabling apparatus 500 may exist in a form of software, or may be an SE in a terminal. As shown in FIG. 5, the capability enabling apparatus 500 includes a processing module 501 and a communications module 502. The communications module 502 is configured to support interaction between the capability enabling apparatus 500 and another device or module. The processing module 501 is configured to control and manage an action of the capability enabling apparatus 500. For example, the processing module 501 may be configured to execute technical processes such as S105 and S106 in FIG. 2, and may be further configured to execute technical processes such as S208 to S210 in FIG. 4; the communications module 502 may be configured to execute technical processes such as S101 and S102 in FIG. 2, and may be further configured to execute technical processes such as S201, S202, S211, and S212 in FIG. 4; and the communications module 502 may be configured to execute technical processes such as S104 in FIG. 2, and may be further configured to execute technical processes such as S207 and S212 in FIG. 4. The capability enabling apparatus 500 may further include a storage module 503, configured to store program code and data of the capability enabling apparatus 500.

Figure 6:
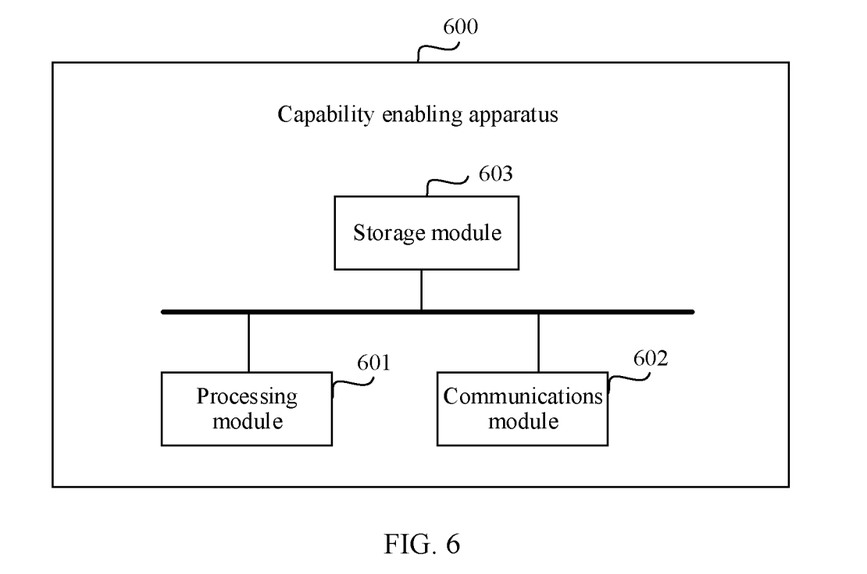
FIG. 6 is a schematic structural diagram of another capability enabling apparatus according to an embodiment of this application.

When an integrated unit is used, FIG. 6 is another possible schematic structural diagram of a capability enabling apparatus according to an embodiment of this application. The capability enabling apparatus 600 may exist in a form of software, or may be a TEE in a terminal. As shown in FIG. 6, the capability enabling apparatus 600 includes a processing module 601 and a communications module 602. The communications module 602 is configured to support interaction between the capability enabling apparatus 600 and another device or module. The processing module 601 is configured to control and manage an action of the capability enabling apparatus 600. For example, the processing module 601 may be configured to execute technical processes such as S103 in FIG. 2, and may be further configured to execute technical processes such as S203 and S205 in FIG. 4; the communications module 602 may be configured to execute technical processes such as S101 and S104 in FIG. 2, and may be further configured to execute technical processes such as S201, S207, and S212 in FIG. 4; and the communications module 602 may be configured to execute technical processes such as S102 in FIG. 2, and may be further configured to execute technical processes such as S202, S211, and S212 in FIG. 4. The capability enabling apparatus 600 may further include a storage module 603, configured to store program code and data of the capability enabling apparatus 600.

It should be understood that division of the units in each of the foregoing apparatuses is only logical function division. In actual implementation, all or some of the units may be integrated into one physical entity, or may be physically separated. In addition, all of the units in the apparatus may be implemented in a form of software invoked by using a processing element; or may be implemented in a form of hardware; or some of the units may be implemented in a form of software invoked by using a processing element, and some of the units may be implemented in a form of hardware. For example, each unit may be a separately disposed processing element, or may be integrated into a chip of the apparatus for implementation. In addition, each unit may be stored in a memory in a form of a program, and invoked by a processing element of the apparatus to perform a function of the unit. In addition, all or some of the units may be integrated together, or the units may be separately implemented. The processing element herein may also be referred to as a processor, and may be an integrated circuit having a signal processing capability. In an implementation process, the steps of the foregoing method or the foregoing units may be implemented by using an integrated logic circuit of hardware in the processor element, or implemented in a form of software invoked by using the processing element.

In an example, the unit in any one of the foregoing apparatuses may be one or more integrated circuits configured to implement the foregoing method, for example, one or more application-specific integrated circuits (application specific integrated circuit, ASIC), one or more microprocessors (digital signal processor, DSP), one or more field programmable gate arrays (field programmable gate array, FPGA), or a combination of at least two of these integrated circuit forms. For another example, when the unit in the apparatus is implemented in a form of a program scheduled by using a processing element, the processing element may be a general-purpose processor, for example, a central processing unit (central processing unit, CPU) or another processor that can invoke the program. For another example, these units may be integrated together and implemented in a form of a system-on-a-chip (system-on-a-chip, SOC).

Based on the same concept as the foregoing method embodiments, an embodiment of this application further provides a computer storage medium. The computer storage medium stores a computer executable instruction. When the computer executable instruction is invoked by a computer, the computer is enabled to execute a specific process of each of the method embodiments provided above. In this embodiment of this application, the computer readable storage medium is not limited. For example, the computer readable storage medium may be a RAM (random-access memory, random access memory) or a ROM (read-only memory, read-only memory).

Based on the same concept as the foregoing method embodiments, an embodiment of this application further provides a computer program product. The computer program product stores an instruction. When the instruction runs on a computer, the computer is enabled to perform the method according to any one of the foregoing possible designs.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may be stored in a computer readable memory that can indicate the computer or another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some possible embodiments of this application have been described, persons skilled in the art can make changes and modifications to these embodiments once they learn of the basic inventive concept. Therefore, the following claims are intended to be construed as including the embodiments of this application and all changes and modifications falling within the scope of this application.

It is clear that persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A capability enabling method comprising:
    establishing, with a trusted execution environment (TEE), a session for communication, wherein the session comprises:
        sending, to the TEE, an obtaining instruction to obtain a security certificate of the TEE; and
        receiving the security certificate from the TEE, wherein the security certificate comprises first attribute information of the TEE, wherein the TEE is in a secure state when the first attribute information meets a preset security policy, wherein the first attribute information comprises platform attribute information of the TEE, and wherein the platform attribute information comprises a developer identifier of the TEE;

and
enabling a first capability for a third-party service in a secure element (SE) when the TEE is in the secure state, wherein enabling the first capability is based on a second capability of the TEE, wherein the second capability comprises a trusted user interface (TUI) capability.

2. The capability enabling method of claim 1, wherein the first attribute information comprises second attribute information of TUI capability, and wherein the second attribute information comprises a peripheral type of a TUI or a peripheral attribute of the TUI.

3. The capability enabling method of claim 1, further comprising:
sending, to the TEE, a session establishment request message requesting to establish the session with the TEE; and
receiving, from the TEE, a session establishment response message indicating that the TEE acknowledges to establish the session.

4. The capability enabling method of claim 3, wherein before sending the session establishment request message to the TEE, the capability enabling method further comprises triggering an interrupt signal using a communications system, and wherein the interrupt signal instructs the TEE to receive the session establishment request message.

5. The capability enabling method of claim 1, further comprising performing authentication that the security certificate is from the TEE and has not been not tampered with.

6. The capability enabling method of claim 1, wherein the obtaining instruction comprises attribute identifiers of the TEE, and wherein the obtaining instruction instructs the TEE to generate the security certificate using TEE attributes corresponding to the attribute identifiers.

7. The capability enabling method of claim 1, wherein when the TEE is in the secure state, the capability enabling method further comprises:
negotiating a communication key with the TEE, wherein the communication key is bound to a status of the TEE, and wherein the communication key is used by the SE to communicate with the TEE; and
deleting the communication key when the TEE is configured to reboot or the TEE attributes change.

8. The capability enabling method of claim 1, wherein the platform attribute information further comprises application programming interface (API) version information of the TEE.

9. The capability enabling method of claim 1, wherein the platform attribute information further comprises an anti-rollback level of the TEE.

10. The capability enabling method of claim 1, wherein the platform attribute information further comprises or version information of an interactive application in the TEE.

11. A capability enabling method, implemented by a trusted execution environment (TEE), wherein the capability enabling method comprises:
establishing, with a secure element (SE), a session for communication wherein the session comprises:
receiving an obtaining instruction from the SE that requests a security certificate of a trusted execution environment (TEE);
performing a message authentication code (MAC) operation on first attribute information using a key, to generate a security certificate, wherein the security certificate comprises the first attribute information, wherein the first attribute information comprises platform attribute information of the TEE, and wherein the key comprises a private key of the TEE, a preconfigured key, or a negotiated key between the TEE and the SE; and
sending the security certificate to the SE.

12. The capability enabling method of claim 11, wherein the first attribute information further comprises second attribute information of a trusted user interface (TUI) capability, wherein the platform attribute information comprises an identifier of the TEE, a developer identifier of the TEE, an operating system version of the TEE, a boot status of the TEE, a lifecycle status of the TEE, application programming interface (API) version information of the TEE, an anti-rollback level of the TEE, and version information of an interactive application in the TEE, wherein the interactive application is a trusted application used to communicate with the SE in the TEE, and wherein the second attribute information comprises a peripheral type of a TUI or a peripheral attribute of the TUI.

13. The capability enabling method of claim 11, wherein the obtaining instruction comprises attribute identifiers of the TEE, wherein the obtaining instruction instructs the TEE to generate the security certificate based on TEE attributes corresponding to the attribute identifiers of the TEE, and wherein the capability enabling method further comprises performing, based on the key, a digital signature operation, or the MAC operation on the TEE attributes, to generate the security certificate.

14. The capability enabling method of claim 11, wherein after sending the security certificate to the SE, the session further comprises:
negotiating a communication key with the SE, wherein the communication key is bound to a status of the TEE; and
deleting the communication key when the TEE is configured to reboot or the TEE attributes change.

15. A capability enabling apparatus comprising:
a communications system, configured to:
establish, with a trusted execution environment (TEE), a session for communication, wherein the session comprises:
sending, to the TEE, an obtaining instruction to obtain a security certificate of the TEE; and
receiving the security certificate from the TEE, wherein the security certificate comprises first attribute information of the TEE, wherein the TEE is in a secure state when the first attribute information meets a preset security policy, wherein the security certificate comprises first attribute information of the TEE, wherein the first attribute information comprises platform attribute information of the TEE, and wherein the platform attribute information comprises an operating system version of the TEE; and
one or more processors coupled to the communications system and configured to
enable a first capability for a third-party service in a secure element (SE) when the TEE is in the secure state, wherein enabling the first capability is based on a second capability of the TEE.

16. The capability enabling apparatus of claim 15, wherein the second capability comprises a trusted user interface (TUI) capability, second attribute information of TUI capability, and wherein the second attribute information comprises a peripheral type of a TUI or a peripheral attribute of the TUI.

17. The capability enabling apparatus of claim 15, wherein the communications system is further configured to:

send, to the TEE, a session establishment request message requesting to establish the session with the TEE; and receive, from the TEE, a session establishment response message indicating that the TEE acknowledges to establish the session.

18. The capability enabling apparatus of claim 17, wherein before the communications system is configured to send the session establishment request message to the TEE, the communications system is further configured to trigger an interrupt signal, and wherein the interrupt signal instructs the TEE to receive the session establishment request message.

19. The capability enabling apparatus of claim 15, wherein the processor is further configured to perform authentication on the security certificate to verify that the security certificate is from the TEE and has not been not tampered with.

20. The capability enabling apparatus of claim 15, wherein the communications system is further configured to negotiate a communication key with the TEE, wherein the communication key is bound to a status of the TEE, and wherein the communication key is used by the SE to communicate with the TEE, and wherein the one or more processors is further configured to delete the communication key when the TEE is configured to reboot or the TEE attributes change.

* * * * *